H. HESS.
ANTIFRICTION BEARING.
APPLICATION FILED NOV. 30, 1908.
929,851.
Patented Aug. 3, 1909.
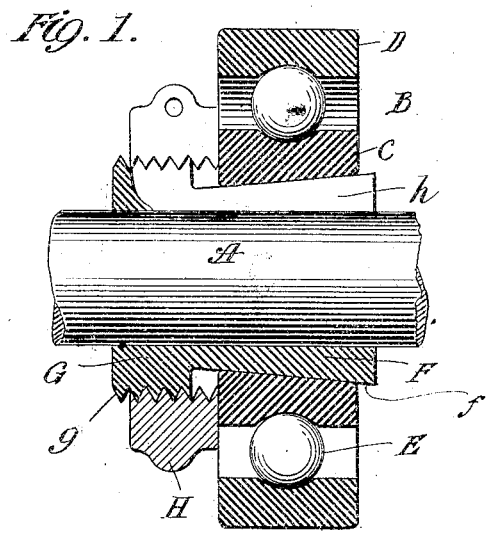
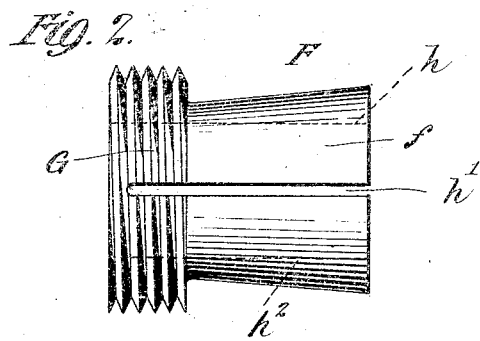
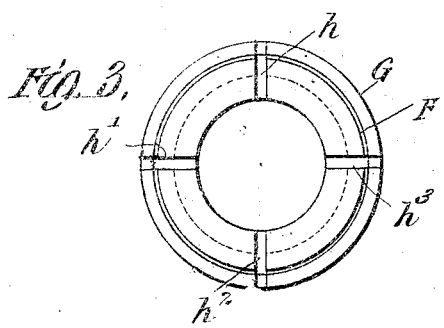
Witnesses:
Inventor
HENRY HESS.

UNITED STATES PATENT OFFICE.

HENRY HESS, OF WAWA, PENNSYLVANIA.

ANTIFRICTION-BEARING.

No. 929,851.  Specification of Letters Patent.  Patented Aug. 3, 1909.

Application filed November 30, 1908. Serial No. 465,084.

*To all whom it may concern:*

Be it known that I, HENRY HESS, a citizen of the United States, residing at Wawa, in the county of Delaware and State of Pennsylvania, have invented certain new and useful Improvements in Antifriction-Bearings, of which the following is a specification, reference being had therein to the accompanying drawing.

This invention relates to anti-friction bearings, and has reference more particularly to the means for securing or mounting the bearing on the support to which it is applied, the invention being designed especially for use in connection with that type of bearing known in the art as "unit" bearings, and embodying inner and outer casing-elements and interposed rolling members.

In a patent granted to me April 23, 1907, No. 851,419, there is disclosed a device for mounting a unit bearing on a supporting shaft, which device is termed an "adapter", and is in the form of a contractile conical bushing encircling the shaft and in turn encircled by the inner casing element of the bearing, the interior of the casing element being coned to fit the conical bushing, and the latter being provided at one end with a screw thread adapted to receive a nut, which being screwed up against the casing element will force the same up the incline of the bushing and contract the latter on the shaft. In this construction, in assembling the parts, the casing element was passed over the threaded end of the bushing, which threaded end, in order to permit this to be done and at the same time avoid the use of a bearing of greater size than necessary to support the load to be sustained, was comparatively thin, thereby preventing the employment of any but a comparatively fine thread of shallow depth. For the purposes demanded in practice, a fine shallow thread is objectionable for the reason that there is liability of stripping when the nut is screwed up to forcibly bind the bushing on the shaft, and for the further reason that owing to its shallow depth, it will permit the take-up of only slight variations in the diameter of the shaft, since a considerable variation would result in the entire disengagement of the threads on the nut and bushing when the latter closed on the shaft.

It is the aim of the present invention to permit the use of a coarse deep thread on the bushing, without increasing the thickness of the supporting portion of the latter, which increased thickness would demand a larger bearing than necessary to support the load, and the invention consists in providing one end of the contractile bushing with a laterally extending annular flange to receive the threads, and in so constructing the parts that in their assemblage, the inner casing-element may be passed over the opposite unthreaded end of the bushing; whereby the transverse thickness of the flange, not being limited by the diameter of the casing-element, as it would be if the casing-element had to be passed over the threaded flange, the latter may be thick enough to permit the use of a deep coarse thread, and this without necessitating any increased or undue thickness in the conical supporting portion of the bushing, so that while there will be no limit to the coarseness or depth of the screw threads on the bushing, the bearing need not be greater in size than is necessary to support the load.

The invention consists also in the details of construction and combination of parts hereinafter described and claimed.

In the accompanying drawings: Figure 1 is a longitudinal sectional elevation of a bearing and its supporting shaft having my invention embodied therein. Fig. 2 is a side elevation of the conical bushing removed. Fig. 3 is an end elevation of the same.

Referring to the drawings: A represents a supporting shaft, B a unit bearing consisting of an inner casing-element C, an outer casing-element D, and a series of interposed rolling members E, and F represents a contractile bushing encircling the shaft and provided with a conical supporting surface $f$, which surface is encircled by the inner casing-element and forms a seat for the same, the bore of which is coned to fit the conical surface of the bushing, so that by the relative movements of the coöperating inclined surfaces of the bushing and casing-element, the bushing will be contracted and caused to bind on the shaft. At its smaller end the bushing is provided with a laterally extending annular flange G, having coarse deep screw threads $g$, on which is screwed a nut H, adapted when screwed up on the flange, to bear against the casing-element C and force the same along the conical supporting portion of the bushing, which action will, by the coöperation of the inclined surfaces on the exterior of the bushing and interior of the casing-element, contract the bushing on the shaft and at the same time bind the casing element firmly and tightly on the bushing, thereby effecting a firm and rigid union of the parts.

To adapt the bushing to be contracted to bind on the shaft as described, it may be split longitudinally at a number of points by slots $h$, $h'$, etc., extending from its unthreaded end and terminating a short distance from the outer end of the flange so as to leave connecting portions at this end, or the slots may extend clear through so as to divide the bushing into a number of separable sections, the action of the nut in either case being, when screwed up against the casing-element, to contract the separated parts of the bushing on the shaft by drawing them together around the shaft.

In assembling the parts, for application to the shaft, the unthreaded end of the bushing is forced by initial compression through the bore of the inner casing-element, the width of the slots in the bushing being such as to permit a sufficient contraction of the parts of the bush to permit the unthreaded end to pass through. The bushing with the nut applied to the opposite threaded end is then slipped over the shaft, and when brought to the proper position thereon, the nut is screwed up against the inner casing-element, with the result that the latter will be forced along the conical supporting portion of the bush, which will be contracted and bind on the shaft.

From the construction described, it will be seen that while the thread on the flange is coarse and deep, the conical supporting portion of the bush is comparatively thin, and not of a diameter to demand a bearing larger than necessary to support the load to be sustained. As a result, there will be less liability of the thread stripping, and the nut may be screwed up with great force against the casing-element, and bind the parts together with corresponding firmness.

The nut H which encircles the threaded flange may be continuous throughout or in one piece, but I prefer as shown in the drawings to split the same and to connect the open ends by a clamping screw, so that when the nut is screwed up against the casing-element and the parts have been brought to the position they are to occupy, the split nut may, by the clamping screw, be bound firmly and tightly on the threaded flange, thereby preventing loosening of the parts.

Having thus described my invention, what I claim and desire to secure by Letters Patent of the United States is as follows:

1. In combination with a support, a contractile conical bushing thereon, a threaded annular flange on the bushing, a nut on the threaded flange, and an anti-friction bearing including an inner casing-element adapted to be passed over the unthreaded end of the bushing, and surrounding the bushing in position to be acted on by the nut.

2. In combination with a support, a contractile bushing thereon formed with a conical supporting portion, a threaded annular flange on one end of the supporting portion and extending outwardly beyond the adjacent surface of the same, a nut on the flange, and an anti-friction bearing including an inner casing-element adapted to be passed over the opposite end of the bushing and be seated on the supporting portion thereof in position to be acted on by the nut.

3. In combination with a support, a bushing surrounding the same, an annular threaded flange on the bushing, a nut on the threaded flange, and an anti-friction bearing including an inner casing element arranged to be passed over the unthreaded end of the bushing, said nut adapted when screwed on the flange, to set the bushing and casing element fixedly with relation to the shaft.

In testimony whereof I have affixed my signature in presence of two witnesses.

HENRY HESS.

Witnesses:
NETTIE L. HAHN,
MARY McCALLA.